United States Patent [19]
Hegarty et al.

[11] Patent Number: 5,446,896
[45] Date of Patent: Aug. 29, 1995

[54] METHOD AND APPARATUS FOR INTER-PROGRAM COMMUNICATION

[75] Inventors: Paul Hegarty, Fremont; Trey Matteson, Palo Alto, both of Calif.

[73] Assignee: Next, Inc., Redwood City, Calif.

[21] Appl. No.: 339,649

[22] Filed: Nov. 14, 1994

Related U.S. Application Data

[63] Continuation of Ser. No. 629,222, Dec. 17, 1990, abandoned.

[51] Int. Cl.$^6$ .............................................. G06F 15/16
[52] U.S. Cl. ................... 395/650; 395/200.01; 395/600; 395/800; 364/284.4; 364/940.62; 364/284.3; 364/DIG. 1; 364/DIG. 2
[58] Field of Search ............... 395/650, 600, 200, 700, 395/725, 800; 370/94.1; 340/825.52

[56] References Cited

U.S. PATENT DOCUMENTS 4,714,992  12/1992  Gladney et al. .................... 395/600
5,079,695  1/1992   Dysart et al. ...................... 395/700

OTHER PUBLICATIONS

Peterson, Larry L., "A Yellow-Pages Service for a Local-Area Network", Computer Communication Review, vol. 17, No. 5, Aug. 11–13 1987 pp. 235–242.

Korth & Silberschatz, *Database System Concepts*, McGraw-Hill, (New York, 1986).

*Primary Examiner*—Thomas G. Black
*Assistant Examiner*—Paul R. Lintz
*Attorney, Agent, or Firm*—Hecker & Harriman

[57] ABSTRACT

A method and apparatus for providing inter-program communication, and in particular, the sharing of algorithms among programs. A "services server" scans programs stored in the mass storage of a computer system and generates a data structure containing attribute information of each service provided by the programs stored in mass storage. This data structure includes an attribute name, the "sendType" of the attribute and the "returnTypes" of the attribute. A sendType is the required format of data provided to the service provider as an input to the service algorithm. The returnType is the format of data that is the result of applying the service algorithm to the input data. SendTypes and returnTypes are ASCII, RTF, TIFF, PICT, etc. When a service requestor is activated, the service requestor scans the services server data structure and generates its own local database of available services with which it can provide the appropriate data format. For example, if a service requestor cannot communicate in graphical formats, such as PICT or TIFF, those service providers on the server database are not retrieved. The service requestor then generates a display list, such as a menu, of available services for a user. When a user wishes to access a service, the user makes a selection which is data, such as text, graphics, etc. Depending on the formats in which the selection can be represented, only certain of the initially available services may currently be valid.

35 Claims, 4 Drawing Sheets

METHOD AND APPARATUS FOR INTER-PROGRAM COMMUNICATION

This is a continuation of application Ser. No. 07/629,222 filed Dec. 17, 1990 now abandoned.

BACKGROUND OF THE INVENTION

1. Field of the Invention

This invention relates to the field of communication between programs and more particularly, to a method of providing a system for sharing algorithms among programs.

2. Background Art

A computer system may include a number of programs available for use by a computer user. Communication between programs may be desired in certain instances. For example, it is often desired to share data between a spreadsheet program and a database management program. Thus, the spreadsheet program and database management program must be able to communicate with each other in a mutually understandable manner. In other instances, a program may require a function or functionality of another program.

In the prior art, inter-program communication is characterized by "data-sharing" schemes and techniques known as "cold links," "hot links" and "warm links." These data sharing schemes are directed to having data appear in two or more places in the same or different forms.

For example, it is possible on some computer systems to copy a picture from a drafting program and "paste" it into a word processing program. Once pasted into a word processing program document, no editing of the picture may be accomplished, since the word processing program does not include tools for editing graphics. In a cold link system, a link is created between the pasted picture and the drawing program. If a user is using the word processing program and accesses the document containing graphics, and if the user desires to edit the graphic, the user performs some operation (such as "double clicking") on the graphics document. This activates the link and sends a message to the drawing program to launch itself so that the drawing program becomes active and the graphics can be edited.

In a hot link system, information can be shared among a number of programs. Whenever that information is altered in one program, all other instances of that information are altered in the other programs as well. For example, a user may copy data from a database management program and paste it into a spreadsheet program document for display. If the copied data is later altered in the database management program, the hot link causes the data of the spreadsheet program to be automatically altered in the same manner as the original information.

In warm links, information that is shared by more than one program is stored in a central location. Programs that share that information are "subscribers" to the information. Periodically, the subscribers poll the storage location, and thus have access to the updated version of the shared file. Alternatively, the "publisher" (program that alters the shared file), notifies subscribers when the shared file has been updated or changed.

One class of inter-program communication involves the request and provision of "services." A service is a function or functionality provided by one program for use by another, where the functionality has a well defined set of input types and a well defined set of output types. These services may include spell checkers, word definitions, synonyms, text editors, graphic editors, electronic mail, etc. In the prior art, services are program-dependent, that is, any available services must be provided by the program itself. In a few cases, services are provided by other programs, but only if the protocol for a communication between the service requestor and the service provider is determined in advance. Therefore, in the prior art, external service programs are specific to and dependent on host programs. Data sharing oriented inter-program communication schemes such as hot links, warm links, and cold links are not used to share provide services for use by programs in the prior art.

In a prior art multi-tasking environment, each application must have its own associated set of services. This results in duplication, for example, if all text editing applications require their own spell checkers. In addition, it is generally not possible to add new services to existing applications.

Data sharing communication schemes are not well suited to provide services to programs. It is therefore desired to provide an "algorithm-sharing" scheme so that programs requesting services can share the functionality of service providers. Formerly, algorithm sharing between programs could only take place if the service requestor "knew in advance" of the protocol for communication with a service provider. In other words, all inter-program communication is program-specific and the prior art does not provide a general solution for algorithm sharing.

Therefore, it is an object of the present invention to provide a method and apparatus for providing a system for algorithm sharing among programs.

It is another object of this invention to provide a system for services to be provided and used by programs.

It is another object of the present invention to provide a system for providing algorithm sharing among programs that utilizes standard data transfer schemes.

SUMMARY OF THE INVENTION

A method and apparatus for providing inter-program communication is described. In particular, a "services server" scans programs stored in the mass storage of a computer system and generates a data structure containing attribute information of each service provided by the programs stored in mass storage. This data structure includes an attribute name, the "send types" of the attribute and the "return types" of the attribute. A send type is the required format of data provided to the service provider as input to the service algorithm. The return type is the format of data that is the result of applying the algorithm to the input data. Send types and return types can be any arbitrary type but are most useful when they are types known by more than one application, e.g. ASCII, RTF, TIFF, PICT, tab-text, PostScript, etc.

When a service requestor is activated, the service requestor scans the services server data structure and generates its own local database of available services. In operation, a service requestor scans the database and retrieves only those services with which it can provide the appropriate format or protocol. For example, if a service requestor cannot communicate in graphical formats, such as PICT or TIFF, information about those service providers that require PICT or TIFF data on the server database are not retrieved. The service requestor then generates a display list, such as a menu of available services for a user. When a user wishes to access a service, the user makes a selection, which is data such as text, graphics, etc. Depending on the format in which the selection can be represented, only certain of the initially available services may currently be valid. The displayed list of available services is continuously updated to reflect the valid services. The user then chooses the desired service among the valid services. The requesting program provides the selection to a service provider where an algorithm is executed and a return message may be generated for the service requestor.

DETAILED DESCRIPTION OF THE INVENTION

A method and apparatus for inter-program communication is described. In the following description, numerous specific details, such as sending formats and receiving formats, are described in detail in order to provide a more thorough description of this invention. It will be apparent, however, to one skilled in the art, that the present invention can be practiced without these specific details. In other instances, well known features have not been described in detail so as not to obscure the present invention.

Figure 1:
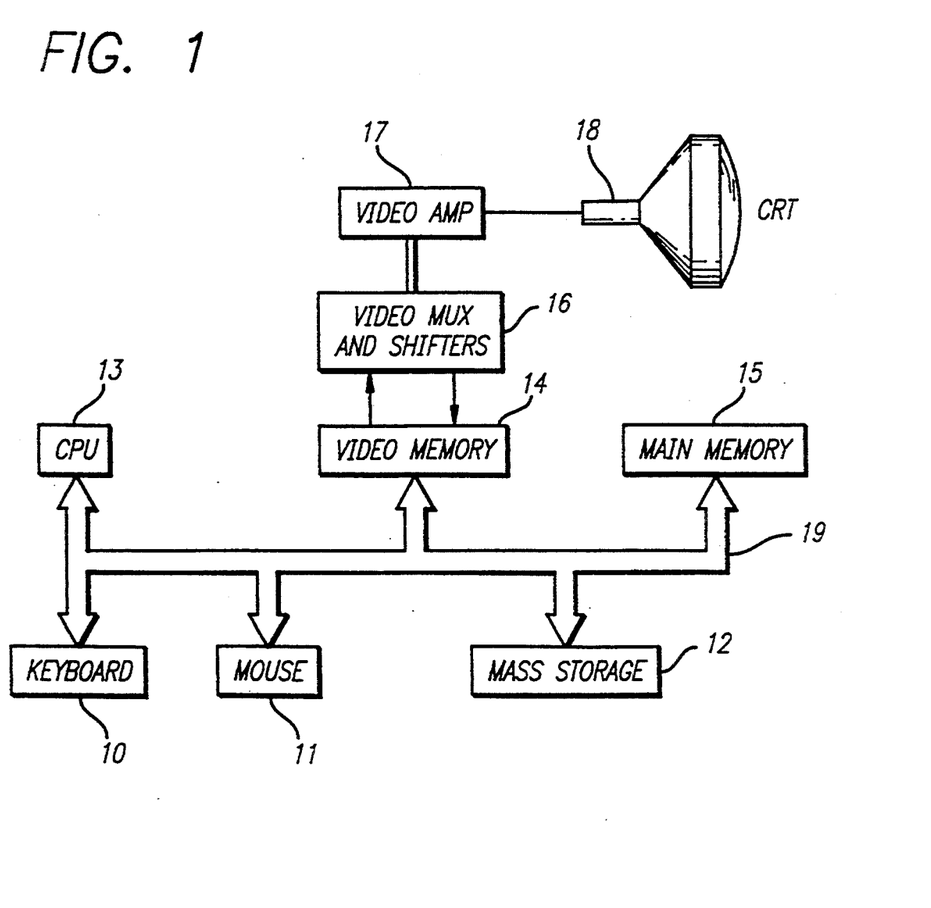
FIG. 1 is a block diagram of a computer system utilizing the present invention.

The present invention may be implemented on any conventional or general purpose computer system. An example of one embodiment of a computer system for implementing this invention is illustrated in FIG. 1. A keyboard 10 and mouse 11 are coupled to a bi-directional system bus 19. The keyboard and mouse are for introducing user input to the computer system and communicating that user input to CPU 13. The computer system of FIG. 1 also includes a video memory 14, main memory 15 and mass storage 12, all coupled to bi-directional system bus 19 along with keyboard 10, mouse 11 and CPU 13.

The mass storage 12 may include both fixed and removable media, such as magnetic, optical or magneto-optical storage systems or any other available mass storage technology. The mass storage may be shared on a network, or it may be dedicated mass storage. Bus 19 may contain, for example, 32 address lines for addressing video memory 14 or main memory 15. The system bus 19 also includes, for example, a 32-bit data bus for transferring data between and among the components, such as CPU 13, main memory 15, video memory 14 and mass storage 12. Alternatively, multiplexed data/address lines may be used instead of separate data and address lines.

In the preferred embodiment of this invention, the CPU 13 is a 32 bit microprocessor manufactured by Motorola, such as the 68030 or 68040. However, any other suitable microprocessor or microcomputer may be utilized. The Motorola microprocessor and its instruction set, bus structure and control lines are described in MC68030 users manual and MC68040 users manual, published by Motorola, Inc. of Phoenix, Ariz.

Main memory 15 is comprised of dynamic random access memory (DRAM) and in the preferred embodiment of this invention, comprises 8 megabytes of memory. More or less memory may be used without departing from the scope of this invention. The video memory 14 is a dual ported video random access memory and in this invention consists, for example, of 256 kbytes of memory. However, more or less video memory may be provided as well.

One port of the video memory 14 is coupled to video multiplexer and shifter 16 which in turn is coupled to video amplifier 17. The video amplifier 17 is used to drive the cathode ray tube (CRT) raster monitor 18. Video multiplexing shifter circuitry 16 and video amplifier 17 are well known in the art and may be implemented by any suitable means. This circuitry converts pixel data stored in video memory 14 to raster signal suitable for use by monitor 18. Monitor 18 is a type of monitor suitable for displaying graphic images, and in the preferred embodiment of this invention, has a resolution of approximately 1,020×832 high. Other resolution monitors may be be utilized in this invention. In operation, the services server of this invention is an instruction set that is stored in main memory and executed by CPU 13. One or more programs are stored in mass storage and paged into main memory, as needed, for access and execution by the CPU 13.

The present invention provides a general solution for inter-program communication that allows services to be provided from a number of programs external to a requesting program without prior knowledge of the requesting program.

Figure 2:
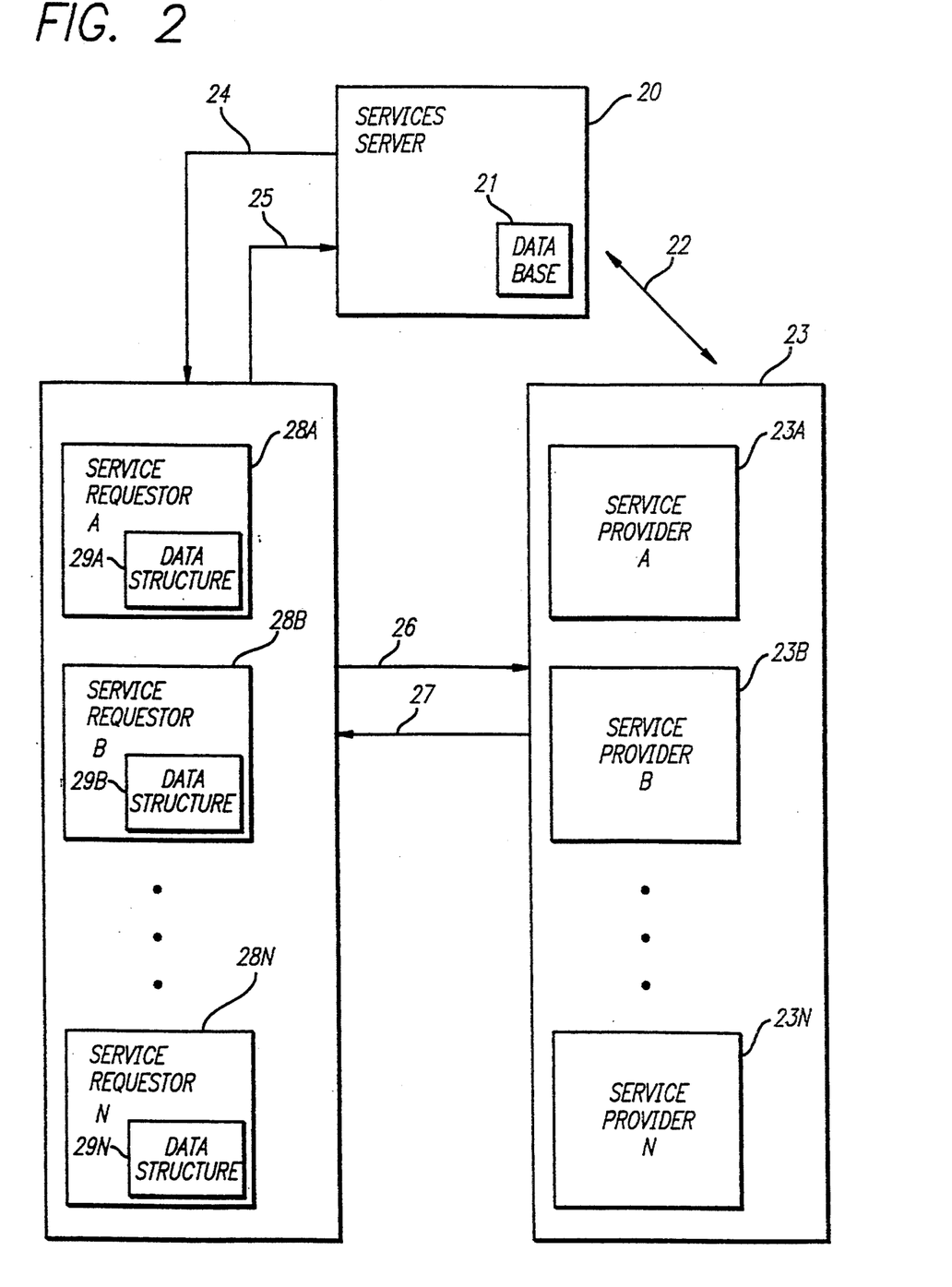
FIG. 2 is a block diagram of the preferred embodiment of this invention.

A block diagram of the preferred embodiment of this invention is illustrated in FIG. 2. A services server 20 is implemented to coordinate and control communication between a number of service requestors 28 and service providers 23. The services server 20 communicates with one or more service providers 23 on line 22. The services server 20 also communicates with service requestors on lines 24 and 25. The service requestors 28 communicate with service providers 23 on lines 26 and 27. Although individual lines are shown for communication between the services server, service requestor and service providers, the communication can take place on bi-directional bus 19 of FIG. 1.

In a computer system, there may be a number of service providers, such as service providers 23A, 23B through 23N. These service providers can provide services, such as electronic mail, on-line dictionary, thesaurus, spell checking, graphic editing, etc. In addition, there may be one or more service requestors, such as service requestors 28A, 28B through 28N. It should be noted that a service provider may also be a service requestor in certain circumstances and vice versa.

SERVICES SERVER

The services server 20 polls all service providers available to a computer system to generate a services database 21. The services database 21 contains the attributes of each service provided by the service providers. The attributes include the service name, the location or port of the service, the service message and the service sendTypes and returnTypes. It may also include other information pertinent to providing the service such as a timeout or provider known, requestor-opaque data.

The service name is the name of the service as it appears in a menu of a service requestor. For example, an electronic mail service provider may be identified by the menu name "MAIL" in the services menu of a service requestor. The location or port information is used to properly route service requests to the appropriate service provider. The port may have the same name as the name of the service. The service message is a message that must accompany a service request to obtain that particular service, since multiple services can be provided on a single port.

SendTypes is a list of formats that can be accepted by a service provider. For example, if the service provider operates on text, it may accept sendTypes of ASCII, RTF (rich text format), etc. Correspondingly, the returnType identifies the formats of information provided by a service provider to a service requestor. The returnTypes need not have a one-to-one correspondence with the sendTypes. For example, a service provider may be able to accept data in ASCII or RTF, but only provide return data in ASCII format. Other send and return types include TIFF, PICT, etc. In addition, either the sendType or returnType may be null.

The service server generates a service database 21. This database is stored in main memory 15 and appears as follows in Table 1:

is sent to specify the particular service desired at a port that permits access to more than one service. For example, the message "send document" is provided to the MAIL port to access the MAIL DOCUMENT service. The message "send selection" is sent to the MAIL port to access the MAIL SELECTION service.

SERVICE REQUESTOR

When a service requestor is initialized or, alternatively, at the time of each service request, the service requestor polls the database 21 of the services server and generates a local data structure, such as local data structures 29A, 29B and 29N. This local data structure is a list of services that the service requestor can request, i.e. the service requestor can provide and receive the data types. A service requestor may not be able to communicate with some service providers because the service requestor may not be able to provide data of the specified sendTypes or receive data back of the specified returnTypes that those service providers' algorithms require. Therefore, by building a local data structure specific to each service requestor, only those services that can actually be accessed by the service requestor will be displayed in the service requestors' menu.

THE REGISTERSERVICESMENUSENDTYPES:ANDRETURNTYPES: ROUTINE

Service requestors register their intent to avail themselves of services with given sendTypes and return-

TABLE 1

| Name | Port | Message | SendType | ReturnType |
|---|---|---|---|---|
| CAPITALIZE WORD | CAPITALIZE | CAPITALIZE | RTF | ASCII, RTF |
| DEFINE WORD | DICTIONARY | DEFINE | ASCII, RTF | Null |
| SPELL | DICTIONARY | SPELL | ASCII RTF | ASCII, RTF |
| SORT | SORT | SORT | ASCII, RTF | ASCII, RTF |
| MAIL DOCUMENT | MAIL | SEND DOCUMENT | File | Null |
| MAIL SELECTION | MAIL | SEND SELECTION | ALL TYPES | NULL |
| CHART | CHART | | TAB-TEXT | PostScript, TIFF, PICT |
| TIMESTAMP | TIME | STAMP | NULL | ASCII |
| ROTATE | GRAPHICS | ROTATE | PostScript, TIFF, PICT | PostScript, TIFF, PICT |

In the example of Table 1, a services name, port, message, sendType and returnType are shown. In this example, there are nine services available, namely, CAPITALIZE WORD, DEFINE WORD, SPELL, SORT, MAIL DOCUMENT, MAIL SELECTION, CHART, TIMESTAMP, and ROTATE.

Figure 3:
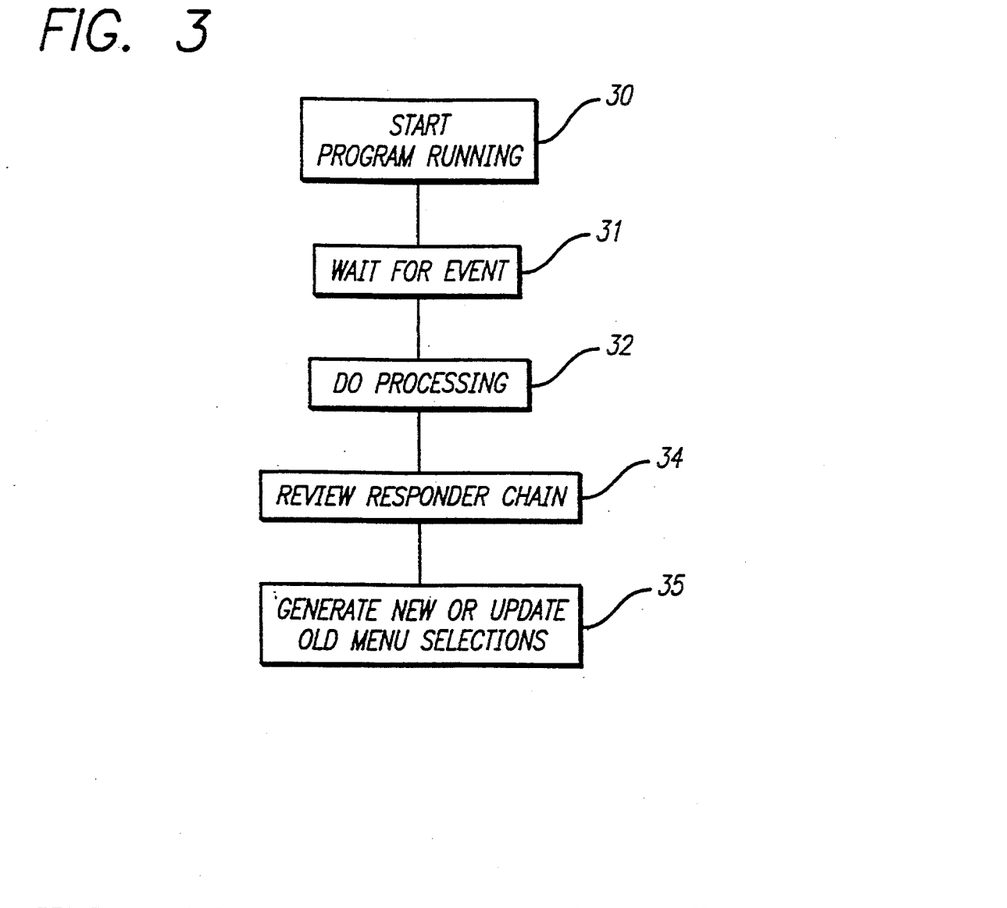
FIG. 3 is a flow diagram illustrating the validRequestorForSendType:AndReturnType: routine of this invention.

In the example shown, the port ID of some services is shown to be the same as the name of the service. This is for purposes of example only and the invention is not limited to this embodiment. In addition, the sendTypes and returnTypes of FIG. 3 are not intended to be exhaustive but merely representative.

Services that have non-null returnTypes are referred to as "synchronous" services. Synchronous services may transfer data and always expect data in response. Examples of synchronous services include CAPITALIZE WORD, SPELL, SORT, CHART, TIMESTAMP and ROTATE.

A service that has a null returnType is referred to herein as an "asynchronous" service. Examples of an asynchronous service are DEFINE WORD, MAIL DOCUMENT, and MAIL SELECTION.

More than one service may be accessed at a single port. For example, both MAIL DOCUMENT and MAIL SELECTION are accessed at the MAIL port. Likewise, both DEFINE WORD and SPELL are accessed at the DICTIONARY port. A different message Types via a routine, referred to as "registerServicesMenuSendTypes:AndReturnTypes:". For example, a service provider registers that it can send and receive in ASCII or RTF. All services that send and receive in ASCII or RTF are then made part of the service requestor's local data structure. For each registered sendTypes/returnTypes combination, those services in the global services database that have matching send and receive types are registered in the local data structure.

The format is as follows:

registerServicesMenuSendTypes: (const char *const
    *)sendTypes andReturnTypes: (const char *const
    *)returnTypes.

This routine is executed with each of the various sendTypes that a service requestor is able to send to a service provider paired with the corresponding returnTypes a service requestor can receive in return from a service provider. Any combination of sendTypes and returnTypes can be registered including NULL for either. Cases of multiple sendTypes or returnTypes are automatically degenerated to all possible combinations. For example, if a requestor can send ASCII or RTF and get ASCII or RTF in return, it can also participate in any service that takes ASCII only and gives nothing in return, or one that takes RTF only and returns ASCII only. Using this routine, a local data structure is generated.

The operation of this routine is illustrated with reference to Table 1. Consider the case where a word processing program is initialized. The registerServicesMenuSendTypes:AndReturnTypes: routine is executed with arguments sendTypes=ASCII, RTF and returnTypes=ASCII, RTF. Therefore, the services CAPITALIZE WORD, SPELL, and SORT are included in the local database. The services DEFINE WORD and MAIL SELECTION are also included, even though they do not return ASCII information. These services are asynchronous and it is assumed that service requestors can send an asynchronous message with the specified sendTypes of data and receive nothing back, because of the degeneration described above. TIMESTAMPS is also included by degenerating its sendTypes to be null and its returnTypes to be ASCII.

THE VALIDREQUESTORFORSENDTYPE:ANDRETURNTYPE: ROUTINE

The local data structure of a service requestor stores all the services that may be accessed by a service requestor. However, only those services that are valid for a particular selection in a service requestor are available in a service menu at any one time. The validRequestorForSendType:AndReturnType: routine is utilized to determine which object in the service requestor is currently prepared to make a request with a given sendType and returnType. By finding those sendType/returnType pairs that have valid requesting objects, it is possible to determine at any given time which services are currently valid overall. It is set forth below:

validRequestorForSendType: (NXAtom)sendType
AndReturnType: (NXAtom)returnType.

The validRequestorForSendType:AndReturnType: routine is executed on the occurrence of each event of a program. An event is defined here as a mouse click, a drag, typing of characters, selection of text or graphics, etc. For example, if a string of text is selected, the service ROTATE is not available, because there is no object in the service requestor that can provide PostScript, TIFF or PICT as an argument to a service. Therefore, the ROTATE service does not appear as a valid service in the services menu of the service requestor, or the the menu selection for ROTATE is disabled. Similarly, if a graphic is selected in a document, the CAPITALIZE WORD, DEFINE WORD, SPELL, SORT, MAIL DOCUMENT, and CHART services are not available and only the ROTATE and MAIL SELECTION services are enabled. In this manner, only those services that can be executed for the particular selection are valid at any one time.

A flow chart of the operation of validRequestorForSendType:AndReturnType: is illustrated in FIG. 3. The process starts at block 30 and the program is running. At block 31, the process waits for an event to occur. When an event occurs, the system proceeds to step 32 and program specific processing takes place.

At step 32, after an event, program specific processing occurs that may or may not affect whether a valid requesting selection exists in the service requestor (e.g. the user may select data that can be represented in a format appropriate for a service). A review of the objects that are selected by the user or are the focus of the user's attention is made. These objects are referred to in the preferred embodiment as a "responder chain" consisting of the first responder (the last area the user worked with the mouse), key window, (the window currently "active"), the key window's delegate, (an object delegated by the key window), the program object, (representing the whole program), and its delegate, if any, is performed at step 34. If there is an object in the responder chain that can participate in requesting, it returns itself to this message if it is able to provide data of the requested type. Based on the review of the responder chain at step 34, the system generates new menu selections or updates old menu selections at step 35. Such a review is specific only to the preferred embodiment. However, any method of tracking the selection made may be utilized without departing from the scope of this invention.

Figure 4A:
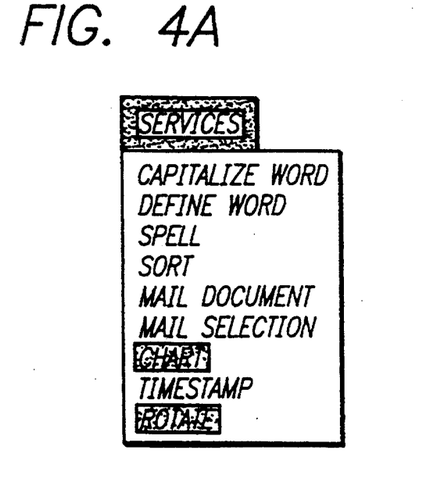
FIG. 4A illustrates a services menu for a text editing application.

For example, if a user is using a program and is editing text, the services menu might appear as in FIG. 4A. In FIG. 4A, only the services CAPITALIZE WORD, DEFINE WORD, SPELL, SORT, MAIL SELECTION, MAIL DOCUMENT, and TIMESTAMP are available. CAPITALIZE WORD, DEFINE WORD, SPELL, SORT, and MAIL SELECTION are available because the selection is usually ASCII or RTF sendType. The MAIL DOCUMENT service is available because the program is always able to provide the entire document as type file. The TIMESTAMP service is available because it does not require any sendType to be valid. The CHART and ROTATE services are disabled (shown as gray text) in FIG. 4A because the current selection is not a valid sendType of an argument to those services (i.e., the selection does not contain graphical data).

Figure 4B:
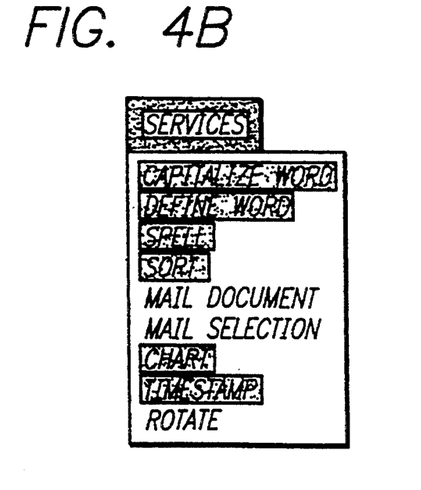
FIG. 4B illustrates a services menu for a graphics application.

In a program when the user is currently editing graphics, the services menu might appear as in FIG. 4B, with MAIL SELECTION, MAIL DOCUMENT and ROTATE as valid services and CAPITALIZE WORD, DEFINE WORD, SPELL, SORT, TIMESTAMP and CHART disabled. If the user begins editing text, those services would be enabled.

THE WRITESELECTIONTOPASTEBOARD:TYPES: ROUTINE

The present invention provides an algorithm sharing scheme for services to be provided and used by programs. This scheme takes advantage of existing data transfer techniques known as "clipboard" or "pasteboard". For purposes of example, this invention is described herein as implemented in a pasteboard environment. A pasteboard is a temporary storage location of data that is to be transferred from one program to another, or to store data that is to be moved from one part of a file to another. The technique of using a pasteboard for temporary storage of data to be transferred is also known as "cut and paste" or "copy and paste" and is well documented in the prior art.

To use a service, typically an "object" is responsible for a selection by a user. An object may be a key window or first responder or application object. The object returned by a call to validRequestorForSendType:AndReturnType: must respond to the following routine:

(BOOL) writeSelectionToPasteboard: (ID)
pasteboard types: (NXAtom *) types

Transfer of data between service requestors and service providers in the preferred embodiment of this invention is accomplished through a pasteboard. As implemented on the NeXT Computer System, (manufactured by NEXT, Inc. of Redwood City, Calif.), a plurality of pasteboards can be defined for use by a number of programs. In the preferred embodiment, each service request transaction generates its own pasteboard. At the time a service request is made, the responder chain is again queried via thevalidRequestorForSendType:AndReturnType: message to determine which object should be sent to writeSelectionToPasteboard:types:.

If a service provider can accept sendTypes of more than one type (i.e., types, the argument to writeSelectionToPasteboard:type has more than one type in it), only one type need be provided. However, the service requestor may provide as many as all sendTypes (if it is able to do so) to the service provider, because the service provider may be able to operate more effectively on one sendType than another. The service requestor only is required, however, to provide one sendType. The service provider is launched, if necessary, so that it may provide the appropriate service.

If the service provider provides asynchronous service, no response is provided to the service requestor through the pasteboard. However, a message or other form of information may appear on the user screen such as a definition of a word. If the service provider is a synchronous service provider, such as CAPITALIZE, data is returned to the service requestor after manipulation by the service provider via the same pasteboard used to send the original data to the service provider.

THE READSELECTIONFROMPASTEBOARD: ROUTINE:

For synchronous services, the following routine is implemented in the service requestor after receiving a response to a service request.

readSelectionFromPasteboard: (id) pboard

This operation is implemented by the service requestor and simply involves replacing the selection placed in the pasteboard by the service requestor with the data currently in the pasteboard, provided by the service provider. The service provider must provide back to a service requestor all returnTypes published by the service provider. For example, if a service requestor provided ASCII text to a service provider, and the service provider has returnTypes of ASCII and RTF, both ASCII and RTF must be provided back to the service requestor, regardless of what sendTypes were actually sent by the service requestor. In the preferred embodiment, usually only one or none of the representations of the data is actually placed in the pasteboard while the other types are "offered" to the service requestor (or service provider in the case of writeSelectionToPasteboard:types:). If the service requestor desires the type that was not initially provided, the pasteboard mechanism accesses the service provider and requests the offered data that is then generated by the service provider and placed in the pasteboard.

Figure 5:
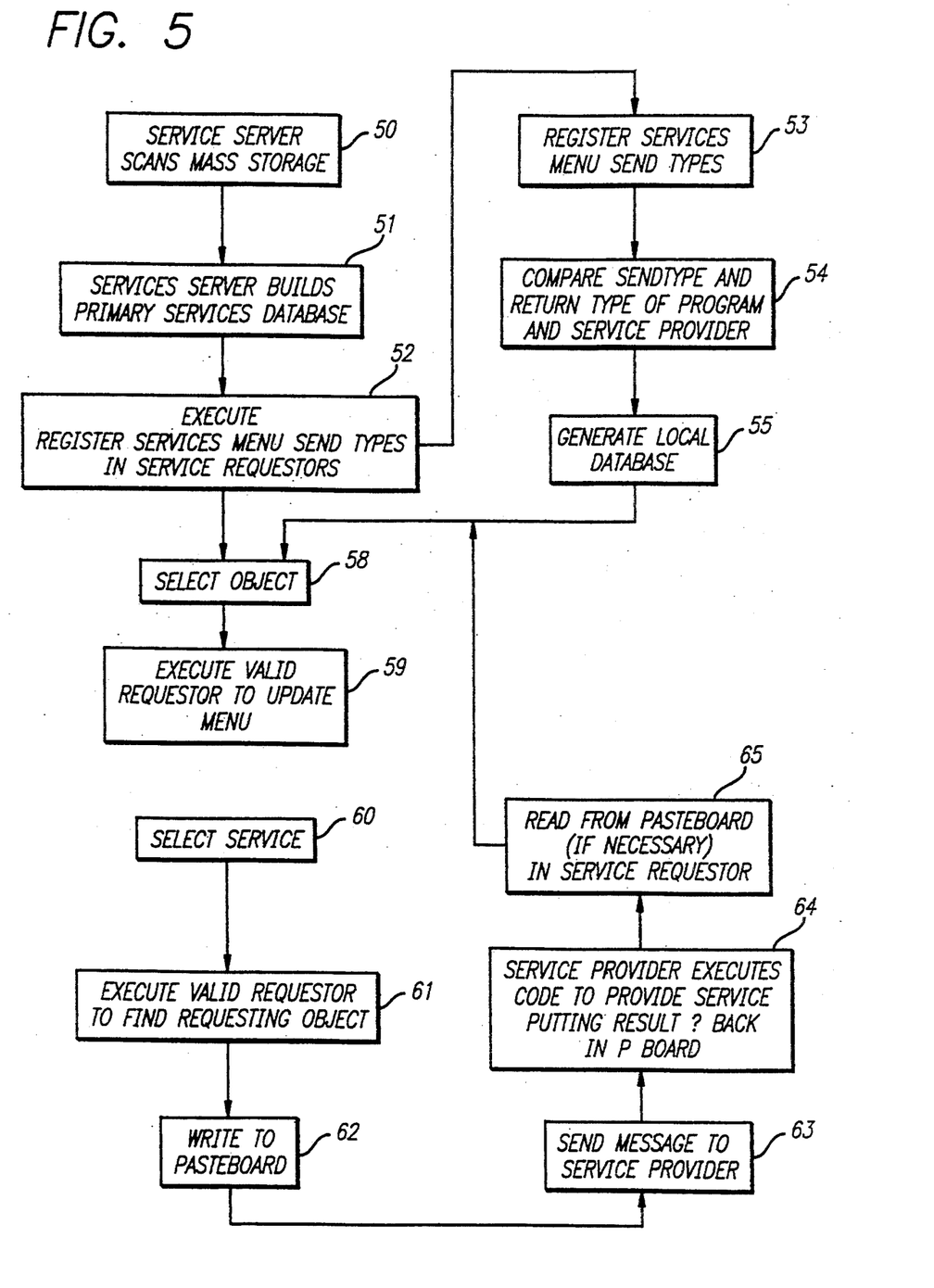
FIG. 5 is a flow diagram illustrating the operation of this invention.

The general operation of this invention is described with respect to FIG. 5. At block 50, the services server scans the mass storage of the computer system for all service providers. At step 51, the services server builds the primary services database. As noted previously, this database consists of the services, their ports, messages, sendTypes and returnTypes.

At step 52, usually coincident with the initialization of service requestor programs, the registerServicesMenuSendTypes:AndReturnTypes: subroutine is executed. This subroutine is shown at steps 53–55. At step 53, the registerServicesMenuSendTypes:AndReturnTypes: begins. At step 54, the sendTypes and returnTypes of the service requestor are registered. At step 55, the local database is generated, based on the sendTypes and returnTypes registered by the service requestor.

At step 58, the user makes a selection. The menu of services is updated at step 59 based on the data types in which the selection the user has made can be represented and on the SendTypes of the services in the local database. At step 60, the user selects a service provider from the menu.

At step 61, a valid requestor is again invoked to find the object in the service requestor which will supply the data for the chosen service.

At step 62, the object is written to the pasteboard so that it can be accessed by the service provider. At step 63, an inter-application message is sent to the service provider. At step 64, the service provider actually provides its service. At step 65, the service requestor reads the return object from the pasteboard if the service is a synchronous service. The system then returns to step 58.

One of the features of this invention is that it enables programs to cooperate in algorithm sharing without prior knowledge of each other, that is, one program does not need to be written with another program in mind to allow algorithm sharing. Services communication (namely, matching service requestors and providers via their sendTypes and returnTypes, and communication by a send message and a return message) is one example of algorithm sharing. The present invention is not limited to the provision of these types of services. For example, the present invention permits algorithm sharing between any programs that can operate on mutually acceptable data types. In the preferred embodiment, the invention takes advantage of existing data transferring mechanisms, such as pasteboard.

The invention provides a method of sharing algorithms between algorithm providers and algorithm requestors by 1) creating a database of all algorithm providers; 2) creating local databases for each algorithm requestor of algorithm providers capable of sharing algorithms with that algorithm requestor by identifying data types that can be provided by an algorithm requestor and operated on by an algorithm provider; 3) generating valid requestors based on data types currently selected by the user in an algorithm requestor; 4) providing a mechanism for initiating the algorithm sharing process; and 5) transferring data between the algorithm requestor and the algorithm provider.

The global database is created and maintained by any acceptable means, such as a server or other supervisory functionality. One example of a means for creating such a database is the services server described herein. The local database may be created by a registration scheme as described above. The requirements of a registration scheme are that the algorithm requestor registers all data types that it can send and receive. All algorithm providers that can send and or receive at least one of the same data types is made part of the local database of that algorithm requestor.

Valid requests are determined periodically, (such as at the occurrence of an event). In this way, only those algorithm providers that are capable of operating on data types that are currently selected by a user or are the object of interest of a user are enabled. One example of a method for validating requests is described above in connection with the validRequestorFor SendTypes:AndReturnTypes: routine.

The algorithm sharing process is initiated by a user, generally by selecting an algorithm provider from a menu of enabled and valid algorithm providers. At that point, data is transferred between the algorithm requestor and algorithm provider, using any acceptable data transfer mechanism, such as clipboard or pasteboard.

The algorithm sharing scheme of this invention can operate on data in many forms, such as in discrete blocks as described above. Another style of data communication suitable for this invention enables a service provider to operate on a service requestor's data as a stream. While processing this stream, the service provider may require interaction with the user, and may wish to give feedback in the service requestor's view of the data.

For example, consider a spell checking service. One user interface is to present the user with a panel with choices, such as "Find next misspelled word," "Guess correct spelling," or "Learn selected word in dictionary." A user begins by choosing "Find." A misspelled word is selected in the text the user is spell checking. If it is a misspelled word, the user may choose "Guess" to find the correct spelling, or simply type in the correction. If it is a correct spelling, he may choose "Learn" so the spell checker can add this word to its dictionary. The user can then use "Find" to go on to the next word of interest.

This service requires that the service provider be able to request data as needed from the requestor as its task or service is performed. The service provider must be able to select words in the requestor so as to give feedback to the user for words that require further action. Also, the service provider must be able to apply changes to pieces of the requestor's data as it operates on the data.

The interactive algorithm sharing described above is referred to herein as "stream services." In this algorithm sharing implementation, a service requestor registers to participate in stream services upon startup by executing a registerStreamService subroutine. The registerStreamService subroutine identifies the service requestor as a program that is capable of participating in generalized algorithm sharing.

The service requestor implements a set of methods to participate in stream services. A "beginStream" subroutine is sent to the service requestor at the start of a stream service interaction, allowing the service requestor to do any necessary initialization.

A "getData" routine is implemented to return additional data to the service provider from the source text in the service requestor starting at the current position in the data stream. The current position in the data stream is established by a "Seek" routine. A "Tell" routine is implemented to return the current position in the stream.

A "Select" routine is implemented to select some data within the data stream. Operation of the Select routine may or may not affect the current position. "Insert" is implemented to insert data over the current selection. "Deletion" is performed by making a selection with Select, and then using inserting zero bytes. The "endStream" routine is sent to the service requestor at the end of a stream service interaction, allowing the service requestor to do any necessary cleanup.

A service provider must implement a "provideStreamService" routine with the service provider at the start of a stream service interaction. The service provider receives an object to which it can send the various methods described above that are implemented by the service requestor.

Another service that implements algorithm sharing of a stream of data is a language translation service. This service can read source text from the requestor in a stream fashion. It may need to interact with the user to disambiguate various options in translation.

Thus, a method and apparatus for inter-program communication and algorithm sharing has been described.

We claim:

1. A method for providing communication between a service requestor program and a plurality of service provider programs resident on a computer system, said service provider programs each executing a service on data provided by said service requestor program, said method comprising the steps of:

scanning by a supervisory process said plurality of service provider programs to generate a primary database of said service provider programs, said primary database including a name of each of said plurality of said service provider programs, any sendTypes associated with each of said service provider programs, where a sendType is a data type that can be read by a service provider program, and any returnTypes associated with each of said service provider programs, where a returnType is a data type that is provided by a service provider program;

comparing said sendTypes and said returnTypes of each service provider program with sendTypes and returnTypes registered by said service requestor program;

generating a local database for said service requestor program, said local database comprising each service provider program having at least one sendType and returnType matching a sendType and returnType of said service requestor program;

selecting data provided by said service requestor program, said data having an associated object sendType;

enabling each of said service provider programs of said local database capable of accepting a sendType of said object sendType;

providing said data to one of said enabled service provider programs;

executing a service on said data by said one service provider program.

2. The method of claim 1 wherein said supervisory process is a services server.

3. The method of claim 1 wherein said step of comparing said sendTypes and returnTypes of said service requestor program with said service provider program, and said step of generating said local database, is performed when said service requestor program is initialized.

4. The method of claim 1 wherein said step of enabling said service provider programs is performed at periodic times.

5. The method of claim 1 wherein said step of enabling said service provider programs is performed when an event occurs.

6. The method of claim 1 wherein a service provider program having at least one sendType and no returnTypes is defined as an asynchronous service provider program.

7. The method of claim 1 wherein a service provider program having at least one returnType is defined as a synchronous service provider program.

8. The method of claim 1 wherein said step of providing said data to said service provider program is performed by providing said data to a temporary storage location shared by said service provider programs.

9. The method of claim 8 wherein said temporary storage location comprises a pasteboard memory.

10. The method of claim 1 wherein said sendTypes and said returnTypes include ASCII, RTF, Postscript, TIFF and PICT data types.

11. A method for providing communication between a service requestor program and a plurality of service provider programs resident on a computer system, said service provider programs each executing a service on data provided by said service requestor program, said method comprising the steps of:
    scanning by a supervisory process said plurality of service provider programs to generate a primary database of said service provider programs, said primary database including a name of each of said plurality of said service provider programs, any sendTypes associated with each of said service provider programs, where a sendType is a data type that can be read by a service provider program, and any returnTypes associated with each of said service provider programs, where a returnType is a data type that is provided by a service provider program;
    comparing said sendTypes and said returnTypes of each service provider program with sendTypes and returnTypes registered by said service requestor program;
    generating a local database for said service requestor program, said local database comprising each service provider program having at least one sendType and returnType matching a sendType and returnType of said service requestor program;
    selecting data provided by said service requestor program, said data having an associated object sendType;
    generating a menu on a display of each of said service provider programs of said local database capable of accepting a sendType of said object sendType;
    selecting one of said service provider programs from said menu;
    providing said data to said one service provider program;
    executing a service on said data by said one service provider program.

12. The method of claim 11 wherein said supervisory process comprises a services server.

13. The method of claim 11 wherein said step of comparing said sendTypes and returnTypes of said service requestor program with said service provider program, and said step of generating said local database, is performed when said service requestor program is initialized.

14. The method of claim 11 wherein said step of enabling said service provider programs is performed at periodic times.

15. The method of claim 11 wherein said step of enabling said service provider programs is performed when an event occurs.

16. The method of claim 11 wherein a service provider program having at least one sendType and no returnTypes is defined as an asynchronous service provider program.

17. The method of claim 11 wherein a service provider program having at least one returnType is defined as a synchronous service provider program.

18. The method of claim 11 wherein said step of providing said data to said service provider program is performed by providing said data to a temporary storage location shared by said service provider programs.

19. The method of claim 18 wherein said temporary storage location comprises a pasteboard memory.

20. The method of claim 11 wherein said sendTypes and said returnTypes include ASCII, RTF, Postscript, TIFF and PICT data types.

21. An apparatus for inter-program communication comprising:
    mass storage means for storing a plurality of service provider programs;
    supervisory process coupled to said mass storage means for scanning said plurality of service provider programs to generate a primary database;
    first storage means coupled to said processing means for storing said primary database, said primary database including a name of each of said plurality of service provider programs, any sendTypes associated with each of said plurality of service provider programs, where a sendType is a data type that can be read by a service provider program, and any returnTypes associated with each of said plurality of service provider programs, where a returnType is a data type that is provided by a service provider program;
    service requestor coupled to said first storage means, said service requestor comparing said sendTypes and said returnTypes of each service provider program with sendTypes and returnTypes associated with said service requestor;
    second storage means coupled to said service requestor for storing a local database, said local database comprising each service provider program having at least one sendType and returnType matching a sendType and returnType of said service requestor program;
    third storage means coupled to said service requestor and said services server for storing data of said service requestor;
    service provider coupled to said third storage means for executing one of said plurality of service provider programs to operate on said data.

22. The apparatus of claim 21 wherein first storage means comprises a services server.

23. The apparatus of claim 21 wherein said service requestor generates a display menu of each of said service provider programs from said data stored in said local database.

24. The apparatus of claim 22 wherein said supervisory process, said service requestor, and said service provider are implemented with a microprocessor.

25. The apparatus of claim 21 wherein a service provider program having at least one returnType is defined as a synchronous service provider program.

26. The apparatus of claim 21 wherein said third storage means comprises a pasteboard memory.

27. The apparatus of claim 21 wherein said sendTypes and said returnTypes include ASCII, RTF, Postscript, TIFF and PICT data types.

28. The apparatus of claim 21 further including enabling means coupled to said menu generating means for enabling said display menu only for those of said service provider programs that can currently provide a service to said service requestor program.

29. A method for providing algorithm sharing between a service requestor program and a plurality of service provider programs resident on a computer system, said service provider programs each executing a service on data provided by said service requestor program, said method comprising the steps of:
   scanning by a services server said plurality of service provider programs to define a primary database of service providers comprising attributes of said plurality of service provider programs;
   scanning said primary database to generate a local database of valid services for said service requestor program by comparing said attributes of said plurality of service provider programs in the primary database to capabilities registered by said service requestor program;
   selecting data in said service requestor program;
   enabling each of said service provider programs in said local database capable of acting on said selected data;
   performing one of said services on said data by transferring said data between said service requestor program and a service provider performing said one service.

30. The method of claim 29 wherein said attributes of a service provider program comprise a service provider name, a list of sendTypes, where a sendType is a data type that can be read by said service provider program, and a list of returnTypes, where a returnType is a data type that can be provided by said service provider program.

31. The method of claim 30 wherein data is transferred by one or both of:
   a. sending data within the service requestor program to said service provider program;
   b. returning data from said service provider program to said service requestor program.

32. An apparatus for supervising message passing in a computer system comprising;
   supervisory function having a first and second communication line for sending and receiving messages;
   requestor function coupled to said supervisory function via said first communication line, said requestor function sending messages to and receiving messages from said supervisory function via said first communication line;
   provider function coupled to said supervisory function via said second communication line, said provider function sending messages to and receiving messages from said supervisory function via said second communication line;
   said supervisory function supervising messages between said requestor and provider functions.

33. A method for sharing algorithms between a plurality of algorithm requestors and a plurality of algorithm providers comprising the steps of:
   scanning by a supervisory function a plurality of algorithm providers to generate a primary database containing attribute information of each of said plurality of algorithm providers;
   examining by a first one of said plurality of algorithm requestors each entry in said primary database to generate a local database, said local database containing information associated with each of said plurality of algorithm providers whose attribute information is compatible with the requirements of said first algorithm requestor;
   enabling each of said compatible algorithm providers;
   selecting one of said compatible algorithm providers, said first one of said compatible algorithm providers accessible by at least a second one of said plurality of algorithm requestors;
   transferring data between said algorithm requestor and said one of said compatible algorithm providers.

34. The method of claim 33 further comprising the steps of:
   examining by said second one of said plurality of algorithm requestors each entry in said primary database to generate a second local database, said second local database containing information associated with each of said plurality of algorithm providers whose attribute information is compatible with the requirements of said second algorithm requestor, said second local database including said first one of said compatible algorithm providers;
   enabling each of said plurality of algorithm providers compatible with said second algorithm requestor including said first one of said compatible algorithm providers;
   selecting said first one of said compatible algorithm providers;
   transferring data between said first algorithm requestor and said one of said compatible algorithm providers.

35. The method of claim 33 further comprising the steps of:
   transferring to said first one of said plurality of algorithm requestors a request by said one of said first compatible algorithm providers for additional data.
   transferring from said first one of said plurality of algorithm requestors to said one of said first compatible algorithm providers said additional data.

* * * * *